(12) United States Patent
Fishler et al.

(10) Patent No.: US 7,939,042 B2
(45) Date of Patent: *May 10, 2011

(54) PROCESS FOR THE PREPARATION OF CONCENTRATED SOLUTIONS OF STABILIZED HYPOBROMITES

(75) Inventors: Theodor Morel Fishler, Haifa (IL); David Feldman, Haifa (IL)

(73) Assignee: Bromine Compounds Ltd., Beer-Sheva (IL)

( * ) Notice: Subject to any disclaimer, the term of this patent is extended or adjusted under 35 U.S.C. 154(b) by 25 days.

This patent is subject to a terminal disclaimer.

(21) Appl. No.: 12/395,936

(22) Filed: Mar. 2, 2009

(65) Prior Publication Data
US 2009/0175962 A1 Jul. 9, 2009

Related U.S. Application Data

(63) Continuation-in-part of application No. 12/353,401, filed on Jan. 14, 2009, which is a continuation-in-part of application No. 10/513,512, filed as application No. PCT/IL03/00363 on May 5, 2003, now abandoned.

(30) Foreign Application Priority Data

May 6, 2002 (IL) .......................................... 149499

(51) Int. Cl.
*C01B 11/20* (2006.01)
*C02F 1/76* (2006.01)
(52) U.S. Cl. ......... 423/265; 423/472; 423/473; 423/275
(58) Field of Classification Search .................. 423/472, 423/473, 265, 275
See application file for complete search history.

(56) References Cited

U.S. PATENT DOCUMENTS

| 3,558,503 | A | 1/1971 | Goodenough et al. |
| 4,650,658 | A | 3/1987 | Shiozawa et al. |
| 5,683,654 | A | 11/1997 | Dallmier et al. |
| 5,795,487 | A | 8/1998 | Dallmier et al. |
| 5,942,126 | A | 8/1999 | Dallmier et al. |
| 6,037,318 | A | 3/2000 | Na et al. |
| 6,066,736 | A | 5/2000 | Fuchs |
| 6,068,861 | A | 5/2000 | Moore, Jr. et al. |
| 6,090,940 | A | 7/2000 | Sugi et al. |
| 6,147,160 | A | 11/2000 | Wang et al. |
| 6,506,418 | B1 | 1/2003 | McKinnie et al. |
| 2003/0035749 | A1 * | 2/2003 | Hann et al. ...................... 422/16 |
| 2005/0249825 | A1 | 11/2005 | Howarth |

FOREIGN PATENT DOCUMENTS

| DE | 3398850 | 3/1985 |
| JP | 63075100 | 4/1988 |
| WO | 9906320 | 2/1999 |

OTHER PUBLICATIONS

Lange's Handbook of Chemistry, 14th edition, editor: John A. Dean; pages—front cover page and 3.54 (1992).

* cited by examiner

*Primary Examiner* — Ngoc-Yen M Nguyen
(74) *Attorney, Agent, or Firm* — Roach Brown McCarthy & Gruber, P.C.; Kevin D. McCarthy

(57) ABSTRACT

The invention provides stabilized concentrated aqueous solutions of alkali hypobromites, as well as a process for the preparation of said stabilized concentrated solutions at low temperatures, comprising reacting a concentrated alkali hydroxide aqueous solution with bromine, adding to the non-stabilized reaction product an aqueous solution of a sulfamic compound to stabilize the hypobromite, and oxidizing bromide to produce additional hypobromite.

7 Claims, 1 Drawing Sheet

US 7,939,042 B2

PROCESS FOR THE PREPARATION OF CONCENTRATED SOLUTIONS OF STABILIZED HYPOBROMITES

CLAIM OF PRIORITY

This application claims priority as a continuation in part application of U.S. patent application Ser. No. 12/353,401 filed on Jan. 14, 2009; which is a continuation-in-part application of U.S. patent application Ser. No. 10/513,512 having a 371(c) date of Jun. 20, 2005 (submitted to the USPTO on Nov. 4, 2004); which is a 371 of PCT/IL2003/000363, filed on May 5, 2003; which claims priority to Israeli patent application serial number 149499, filed on May 6, 2002.

FIELD OF THE INVENTION

This invention relates to a method for the preparation of concentrated solutions of stabilized hypobromites. This invention also relates to stabilized solutions of hypobromites obtained by the process of this invention.

BACKGROUND OF THE INVENTION

Hypobromous acid is one of the most potent sanitizers among the oxidizing halogenated compounds. Since it is a weaker acid than hypochlorous acid (pK=8.8 at 25° C.), it is predominant at pH higher than 9.

Alkaline hypobromites can be prepared at low temperature, with good yield, if an excess of hydroxide is provided. A supersaturated solution can be prepared at 10° C., if 90% of the equivalent amount of bromine is fed to a 10 N solution of NaOH or KOH. The pentahydrate $NaBrO.5H_2O$ begins to precipitate at −3° C., and keeps precipitating at lower temperatures, while the heptahydrate begins to precipitate at −7° C., and keeps precipitating at lower temperatures. However, the precipitation is slow. This mode of operation enables the preparation of MOBr solution (M=Na, K), but these are not stable enough for practical and commercial application. Concentration increase of the MOBr has a beneficial effect on the stability because of the simultaneous decrease of water concentration Hypobromites, e.g. sodium hypobromite, can also be prepared from the reaction of bromides with an oxidant, e.g., chlorine or hypochlorite. The reaction with hypochlorite has the disadvantage of yielding equivalent amounts of NaOBr and NaCl. Since the NaOCl solutions themselves contain NaCl in equivalent amount with NaOCl, and mostly contain at most 15.8 wt % NaOCl, the obtainable concentration of NaOBr is relatively low.

The strong oxidizing potential of the hypobromous acid and hypobromites made them very difficult to stabilize. Several classes of stabilizers, among them amides, amines, sulfonamides, melamine, sulfamic acid, cyanuric acid, and hydantoins, have been suggested in the prior art. However, amides and amines are generally oxidized by the hypobromites. Urea is decomposed down to nitrogen and other amides are transformed to amines that in turn can be oxidized to nitrogen.

Sulfamic acid and its salts have been mentioned as stabilizers, being stable to the attack of hypochlorous and hypobromous acids. The latter react at low temperatures with the alkali salts of sulfamic acid, affording chloro- and bromoamidosulfonates $XHN—SO_3M$ (X=Halogen). However, some strong oxidants, among them chlorine and bromine, can attack the $NH_2$ function liberating nitrogen.

U.S. Pat. No. 5,683,654 discloses a process which comprises preparing an aqueous solution of unstabilized alkali or alkaline earth metal hypobromite by mixing and reacting the corresponding hypochlorite with a water-soluble bromide ion source and stabilizing the result with an aqueous solution of an alkali metal sulfamate. U.S. Pat. Nos. 5,795,487 and 5,942,126 disclose essentially the same process.

U.S. Pat. No. 6,037,318 describes a process for the manufacture of alkaline bleaching compositions which comprises three steps: a) admixing a source of sodium hypochlorite and an amino compound which may be sulfamic acid, to form a pre-bromine admixture; b) adding to the mixture a source of bromine; and c) adjusting the pH of the resulting mixture to at least 13. However, since hypochlorite solutions generally contain chlorides in an equivalent amount with hypochlorites, the resulting mixtures contain large amounts of sodium chloride. Further, since the stabilizer, e.g., sulfamic acid, and the hypochlorite are mixed before the addition of a bromine source, the efficiency of the stabilizer is decreased, because it reacts with the hypochlorite. The stabilized solution has a low NaOBr concentration because of the low concentration of the starting NaOCl solution.

DE 3398850 discloses stabilizing solutions of sodium hypochlorite with a stabilizer which may be the sodium salt of amidosulfonic acid. It does not teach the preparation of hypobromite solutions.

U.S. Pat. No. 6,068,861 describes a process of making a concentrated liquid biocide formulation, in which bromine chloride and an alkali metal salt of sulfamic acid are mixed. Bromine chloride is difficult to handle and tends to dissociate to bromine and chlorine. It is not a commercial product and must be manufactured by using special skills and expensive installations for keeping it in liquid phase under pressure.

It is a purpose of this invention to provide a method for obtaining stabilized solutions which contain high concentrations of alkali hypobromites.

It is another purpose of the invention to provide such solutions in which bromine is fed as such and not through a more complex source of bromine.

It is a further purpose of this invention to provide such a process that provides hypobromite solutions having an amount of active halogen, expressed as available chlorine, that is higher than that of any solution prepared according to the prior art.

It is a still further purpose of this invention to provide a sanitation method for bodies of water, such as industrial water in cooling towers, pulp and paper waste and the like, in the pH range of 5-10, by feeding the hypobromite solution prepared according to the process of the invention, so that the proper active HOBr concentration (expressed as available chlorine) is achieved.

Other purposes and advantages of the invention will appear as the description proceeds.

SUMMARY OF THE INVENTION

The invention provides a process for the preparation of stabilized aqueous solutions of high concentration hypobromites, comprising the steps of: a) contacting a concentrated alkali hydroxide aqueous solution with bromine, in a hydroxide-bromine equivalent ratio from 2:1 to 3:1; b) allowing the mixture to react at a temperature from −7 to 15° C., preferably from −5 to 10° C., thereby obtaining a solution of unstabilized alkali hypobromite, and alkali bromide; c) adding to said solution of step b) an aqueous solution of a sulfamic compound selected from the group consisting of sulfamic acid and soluble sulfamic acid salts, at a molar ratio of sulfamate to hypobromite from 1:1 to 2:1, and preferably between 1.2:1 and 1.5:1, at a temperature from −5° C. to 10° C., whereby to form stabilized hypobromite solution containing alkali bromide; and d) admixing to said stabilized hypobromite solution an oxidant to oxidize said alkali bromide, thereby obtaining a stabilized aqueous solution of high concentration hypobromite; wherein said stabilized aqueous solutions of high concentration hypobromites have at least 10 wt % hypobromites if expressed as NaBrO. The sulfamic compound is preferably sodium sulfamate. The hydroxide-bromine molar ratio is preferably not less than 2.2:1. In a preferred embodiment of the invention, the mixture of alkali hydroxide solution with bromine is allowed to react at a temperature of 0±5° C. Said oxidation process is preferably performed at a temperature of 0±5° C. The oxidant may be selected from the group consisting of sodium hypochlorite, calcium hypochlorite, chlorine, hydrogen peroxide, and oxone. Preferably, said oxidant is sodium hypochlorite having a concentration of at least 10.5% expressed as available chlorine. The sodium hypochlorite may be formed in situ from chlorine and sodium hydroxide. The process according to the invention may further comprise adding a sulfamate solution to said stabilized aqueous solution of high concentration hypobromite obtained in said step d), to a molar ratio of sulfamate to hypobromite not greater than 1.5:1. In one aspect, the process according to the invention may comprise on-line formation of high concentrated hypobromite at a site of needed use; the process may comprise forming a first liquid stream and a second liquid stream, wherein said first liquid stream comprises said stabilized hypobromite solution containing alkali bromide, and wherein said second liquid stream comprises said oxidant, the two streams meeting near the location of the intended use, thereby providing a high concentration hypobromite solution at said location.

The invention provides a stabilized alkali hypobromite solution, preferably a sodium hypobromite solution, containing at least 8 wt % of sodium hypobromite, preferably at least 10 wt % sodium hypobromite, less than 1 wt % of sodium bromide, less than 7 wt % of sodium chloride, and at least 12 wt % of sodium sulfamate. Said stabilized sodium hypobromite solution preferably contains at least 15 wt % sodium hypobromite. The available chlorine of said solution is at least 6%, and preferably at least 9%. A stabilized alkali hypobromite solution according to the invention may comprise up to 15% of available chlorine. The stabilized, high concentration, alkali hypobromite solution according to the invention, preferably sodium hypobromite solution, is very useful for disinfection of industrial water in cooling towers, pulp and paper wastes and similar.

The process of the invention comprises the following steps:
a) contacting a concentrated alkali hydroxide aqueous solution with bromine, in a hydroxide-bromine equivalent ratio that is from 2:1 to 3:1 and is preferably not less than 2.2:1;
b) allowing the mixture to react at a temperature from −5° C. to 10° C., preferably 0±5° C.;
c) adding to the product of said reaction, which comprises unstabilized alkali hypobromite, a concentrated aqueous solution of a sulfamic compound, chosen from the group consisting of sulfamic acid and soluble sulfamic acid salts, so that a molar ratio of said acid or salt to hypobromite is from 1:1 to 2:1 and preferably about 1.5:1, at a temperature from −5° C. to 10° C. and preferably 0±5° C., whereby to form a stabilized hypobromite solution.

The preferred sulfamic compound is sodium sulfamate.

The aqueous solution obtained is free from alkali chloride. It contains, depending on the concentration of the sulfamic acid or sulfamate solution, an amount of active halogen, expressed as available chlorine, from 7 to 11.5 wt %, based on the weight of the whole solution and determined by iodometric titration. The solution prepared by the process defined hereinbefore, has a higher stability than the solution of the prior art, as will be specified later on.

The preferred alkali hydroxide is sodium hydroxide.

The solution according to the invention contains alkali bromide, preferably e.g. sodium bromide. Its alkali, e.g. sodium, chloride content is less than 1 wt % and its amount of available halogen, expressed as chlorine, is at least 7%. It further contains from 13 to 19 wt % of sulfamate anion. Said solution is an aspect of the present invention.

Obviously, as being clear for anybody skilled in the art, these concentrations are given for a 100% yield; as obvious to the skilled in the art, somewhat lower yields are practically obtained, depending on the ability of the operator and precision of temperature and weight control. The yields actually achieved are usually between 96% and 98%.

In another embodiment of the invention, said bromide can be further oxidized with a known oxidizer, e.g. sodium hypochlorite, oxone, calcium hypochlorite, chlorine, hydrogen peroxide, etc., at the same low temperature at which the alkali hydroxide has been allowed to react with bromine in the first stage of the process. Preferably, if sodium hypochlorite is used as oxidizer, it should have a concentration of at least 10.5%, preferably at least 12.5%, expressed as available chlorine. The hypochlorite can be formed in situ from chlorine and a hydroxide, e.g. sodium hydroxide. The hypobromite is thus obtained in an amount equivalent to that of the alkali bromide, e.g. sodium bromide. The newly formed hypobromite can be further stabilized by an addition of a concentrated sodium sulfamate solution at a molar ratio of sulfamate to hypobromite from 1:1 to 1.5:1 and preferably 1.1:1, at a temperature from −5° C. to 10° C. and preferably 0±5° C.

In another embodiment, the production of supplementary amount of NaOBr from the sodium bromide present in the stabilized bromine solution can be done on-line, at the site of the intended use, by pumping the sodium hypochlorite solution and the stabilized bromine solution at required flow rates and by contacting the two solutions at a distance before the site of use, such that at the site of use the two solutions have been mixed, and the reaction between the sodium hypochlorite and the sodium bromide has been complete. The newly formed sodium hypobromite adds to the existing one in the stabilized solution, and the resulting mixture is immediately contacted with the liquid to be disinfected. By this mode of use there is no need for more stabilizer since the hypobromite reacts immediately with the organic matter. This embodiment will be illustrated in the following example.

The solution obtained after said further oxidation contains, depending on the oxidant used (oxone, TCCA, hydrogen peroxide, etc.) and on the amount and concentration of eventually added supplementary sodium sulfamate, contains at least at least 6 and up to 15% available chlorine, and stabilized high concentration alkali hypobromite, e.g. sodium hypobromite in a concentration of from about 9 wt % to about 23 wt %, less than 1 wt % of sodium bromide, less than 7 wt % and down to 0 wt % of alkali, e.g. sodium, chloride, and a corresponding amount of alkali sulfamate, e.g. sodium sulfamate.

Preferably, sodium hypobromite in a stabilized high concentration aqueous solution is from about 10 to about 20 wt %.

BRIEF DESCRIPTION OF THE DRAWING

The above and other characteristics and advantages of the invention will be more readily apparent through the following examples, and with reference to the appended drawing, wherein.

DETAILED DESCRIPTION OF PREFERRED EMBODIMENTS

Figure 1:
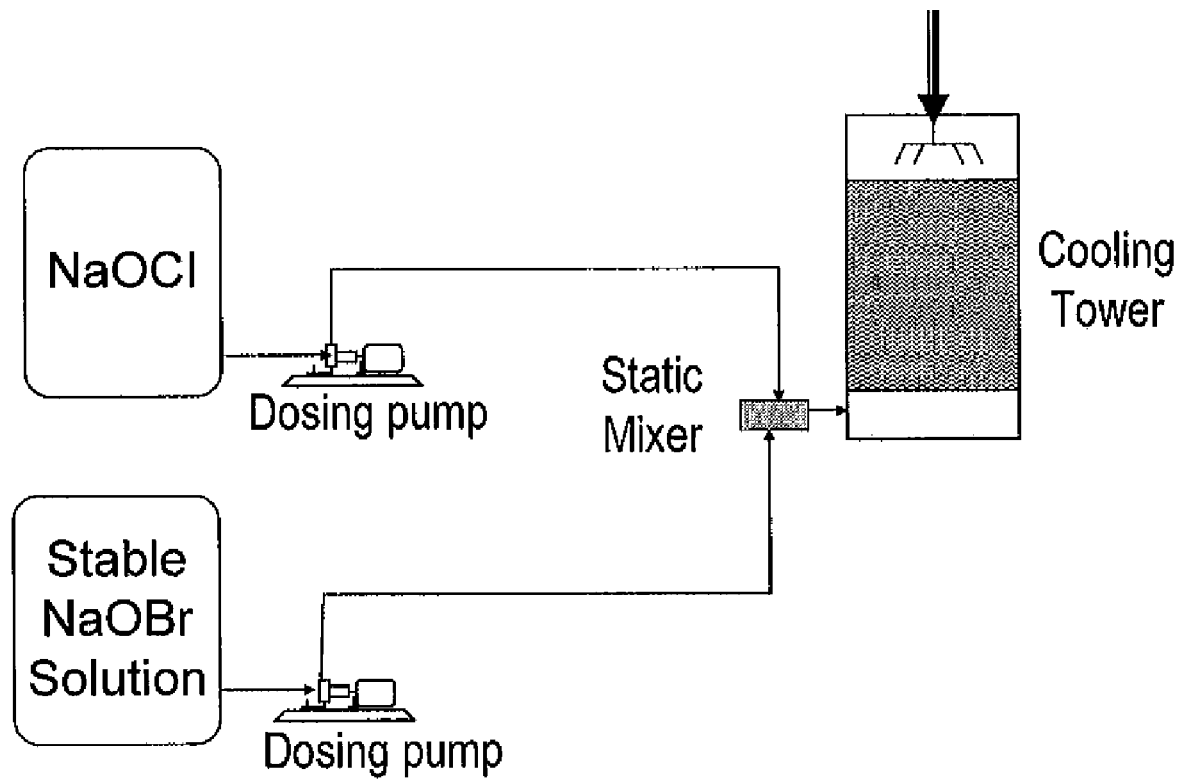
FIG. 1. shows a schematic setup for the an on-line preparation of concentrated hypobromites solutions near the location of the desired use.

The following examples illustrate the invention without being limitative. The percentages given are all by weight.

EXAMPLE 1

A concentrated hypobromite solution was prepared by contacting, under vigorous stirring, a mixture of 532.5 g of a concentrated aqueous NaOH solution (49.2 wt %) and 494 g water with 480 g bromine, while adding gradually so that the temperature is maintained at 0±5° C. The NaOH/bromine molar ratio was 2.2:1. A clear, dark yellow solution of unstabilized sodium hypobromite was obtained, which contained 23.2 wt % NaOBr and 20.5 wt % NaBr. In spite of the very high concentration and low temperature, no precipitation occurred due to the very high solubility of NaBr. To the above hypobromite solution, an aqueous solution of sodium sulfamate was added gradually, in order to keep the temperature between −5 to 10° C., preferably 0-5° C.

The above said aqueous solution of sodium sulfamate was prepared by gradually adding at room temperature 401.7 g of an aqueous 49.2 wt % NaOH solution to 836.5 g of an aqueous slurry composed of 436.5 g sulfamic acid and 400 g water, was added to the. Alternatively, said sulfamate can be prepared by adding 36 g of a 49.2% NaOH solution to a solution of 535.5 g commercial sodium sulfamate in 666.7 g water.

The molar ratio between Na sulfamate and NaOBr was somewhat greater than 1.5:1. The resulting solution (2745 g) contained 12.7 wt % stabilized NaOBr, 11.5 wt % NaBr (ca one mole per mole of NaOBr), and 19.5 wt % of sodium sulfamate. The amount of active halogen, expressed as available chlorine, determined by iodometry, was 7.5%.

EXAMPLE 2

In a reactor provided with cooling jacket and mixing device, introduced was 500 g stabilized bromine solution prepared as described in Example 1. To this solution, cooled at 0-5° C., was added 377 g of a sodium hypochlorite commercial solution containing 11% sodium hypochlorite (expressed as available chlorine) that reacted with the NaBr present, forming NaOBr. The solution in the reactor (877 g) then contained ca 14.6% NaOBr, practically no NaBr, 4.6% NaCl and 10.9% sulfamate. The solution can be utilized as such but it is less stable on storage because the ratio between sulfamate and hypobromite is less than required. This solution contained 8.8% available halogen (as $Cl_2$).

EXAMPLE 3

A more stable, but less concentrated, stabilized bromine solution was prepared by adding, at 0-10° C., to the mixture prepared as in Example 2, 222 g sodium sulfamate, prepared as in Example 1. The 1109 g solution thus obtained contained ca 11.5 wt % sodium hypobromite. In terms of available chlorine it contained ca 7% available chlorine. The molar ratio of sodium sulfamate to NaOBr in this solution was 1.5:1.

EXAMPLE 4

The solution of Example 2 can be prepared and used without the addition of more sodium sulfamate by preparing the solution on-line, as close as possible to the use location. A schematic setup for the preparation of this solution is given in FIG. 1. The two solutions, the 12.7% stabilized hypobromite and 11% hypochlorite are fed to the static mixer at a mass flow rate ratio of 1:0.754 (volumetric flow rate ca 1.1:1). Supposing that the amount of make-up to be disinfected added to the cooling tower is 20000 l/h, and that the amount of available chlorine required is 2.5 ppm the mass flow rates of the two solutions should be 323 and 244 g/h (222 and 203 ml/h) respectively. The resulting solution is directly fed to the cooling tower. Due to a short time period between mixing the two streams and the use of the mixture, the stability of the NaOBr until entering the cooling tower is sufficient.

While a number of examples have been given by way of illustration, it should be understood that the invention can be carried out with many modifications, variations and adaptations, without departing from its spirit or exceeding the scope of the claims.

The invention claimed is:

1. Process for the preparation of aqueous solutions of high concentration hypobromites, comprising the steps of:
   a) contacting a concentrated sodium hydroxide aqueous solution with bromine, in a hydroxide-bromine equivalent ratio from 2:1 to 3:1;
   b) allowing the mixture to react at a temperature from −5 to 10° C., thereby obtaining a solution of unstabilized sodium hypobromite, and sodium bromide;
   c) adding to said solution of step b) an aqueous solution of sodium sulfamate, at a molar ratio of sulfamate to hypobromite from 1:1 to 2:1, at a temperature from −5° C. to 10° C., whereby to form stabilized sodium hypobromite solution containing sodium bromide; and
   (d) admixing to said stabilized sodium hypobromite solution an oxidant and reacting said oxidant with said sodium bromide to produce additional sodium hypobromite, thereby obtaining an aqueous solution of high concentration sodium hypobromite.

2. Process according to claim 1, wherein the hydroxide-bromine equivalent ratio is not less than 2.2:1.

3. Process according to claim 1, wherein said molar ratio of sulfamate to hypobromite is between 1.2:1 to 1.5:1.

4. Process according to claim 1, wherein the oxidant is selected from the group consisting of sodium hypochlorite, calcium hypochlorite, chlorine, hydrogen peroxide, and oxone.

5. Process according to claim 4, wherein said sodium hypochlorite is formed in situ from chlorine and sodium hydroxide.

6. Process according to claim 1, further comprising adding a sodium sulfamate solution to said aqueous solution of high concentration sodium hypobromite obtained in said step d), to a molar ratio of sulfamate to hypobromite not greater than 1.5:1.

7. Process according to claim 1, step (d) is carried out by forming a first liquid stream and a second liquid stream, wherein said first liquid stream comprises said sodium hypobromite solution containing sodium bromide, and wherein said second liquid stream comprises said oxidant, admixing the two streams near a location and the obtained high concentration sodium hypobromite solution can be used at said location.

* * * * *